United States Patent [19]
Weiss et al.

[11] 3,779,307
[45] Dec. 18, 1973

[54] HEATING AND COOLING SYSTEM FOR MOTOR VEHICLES

[75] Inventors: Paul Weiss, Vaihingen; Helmut Bardong, Stuttgart; Wolfgang Frank, Ludwigsbur-Ossweill, all of Germany

[73] Assignee: Firma Su Ddeutsche Kuhlerfabrik Julius Fr. Behr., Stuttgart-Feuerbach, Mauserat, Germany

[22] Filed: Nov. 26, 1971

[21] Appl. No.: 202,099

[30] Foreign Application Priority Data
Nov. 26, 1970 Germany.................. P 20 58 280.3

[52] U.S. Cl................. 165/42, 165/35, 237/12.3 B
[51] Int. Cl.............................................. B60h 1/06
[58] Field of Search .................... 165/23, 42, 34, 35, 165/36; 237/12.3 B, 8 A

[56] References Cited
UNITED STATES PATENTS

| | | | |
|---|---|---|---|
| 2,749,048 | 6/1956 | Edge .............................. 237/12.3 B |
| 3,236,056 | 2/1966 | Phillips et al. ..................... 165/42 X |
| 3,421,576 | 1/1969 | Roane................................. 165/42 X |
| 1,943,969 | 1/1934 | Hulse..................................... 165/23 |
| 2,264,945 | 12/1941 | Lefevre........................... 237/12.3 B |
| 2,915,298 | 12/1959 | Hamlin et al. ..................... 165/36 X |
| 2,258,089 | 10/1941 | Dunn................................. 165/36 X |
| 2,374,639 | 4/1945 | Miller ............................... 165/36 X |
| 3,223,150 | 12/1965 | Tramontini............................ 165/34 |
| 2,383,878 | 8/1945 | Miller ............................... 165/36 X |

FOREIGN PATENTS OR APPLICATIONS

| | | | |
|---|---|---|---|
| 1,170,342 | 11/1969 | Great Britain ................. 237/12.3 B |
| 767,631 | 7/1934 | France.............................. 237/8 A |

*Primary Examiner*—Manuel A. Antonakas
*Attorney*—Alvin Browdy

[57] ABSTRACT

A heating and cooling system for motor vehicles having a primary circuit including a pump driven by the engine for cooling the engine of the motor vehicle and a secondary circuit including a pump driven independently of the engine for heating and cooling the passenger compartment of the motor vehicle. The two circuits are connected by a 4-way mixing valve or a hydraulic bridge so that the same coolant circulates through both circuits, but the circulation of coolant through the secondary circuit is independent of engine r.p.m. The secondary circuit further includes means to regulate the amount of hot coolant coming from the engine and cold coolant coming from a cooling means which enters the passenger compartment air heat exchanger so that the same heat exchanger can continuously control the temperature of the air passing therethrough from cold to hot.

11 Claims, 4 Drawing Figures

HEATING AND COOLING SYSTEM FOR MOTOR VEHICLES

The present invention relates to a coolant circuit for heating and/or cooling work areas, more particularly for heating and cooling vehicles, for examples, with an air conditioner run by an internal combustion engine, with a primary coolant circuit and a secondary heat-exchanger circuit, preferably with a thermostat in the primary circuit and an engine-driven pump.

Coolant circuits, especially those using water, of the general type described above are known in motor vehicles, in which the heater heat-exchanger is connected to the cooling water intake and cooling water return. The throughput is regulated by a valve, which valve is dependent on the motor speed (r.p.m.). Satisfactory operation is achieved, however, only if sufficient coolant is supplied by the engine-driven pump under all operating conditions.

In another known embodiment of this type of device, a shunt valve is provided, to which the heater heat-exchanger is connected. In this case, the throughput available to the heater heat-exchanger is also dependent on the engine r.p.m. To cool the work area, a cooling circuit is used parallel to the heater circuit, such cooling circuit effecting the desired cooling by means of a separate heat exchanger, preferably an evaporator, fitted with a fan.

It is, accordingly, an object of the present invention to overcome defects in the prior systems; and another object is to provide for improved heating and cooling.

Another object of the present invention is to construct a circuit of the general type described above in such a fashion that the throughput through the heater heat-exchanger is independent of the engine r.p.m., that the water admission temperature is as high as possible and simultaneously constant, and that only one heat exchanger is required to heat and cool the work area.

This goal is achieved in accordance with the present invention essentially by having an additional pump in the secondary circuit and a multichannel mixing valve in the connecting lines to the primary circuit. A constant throughput in the secondary circuit is ensured by the additional pump.

A further solution of the problems which are the subject of the present invention involves providing an additional pump in the secondary circuit and connecting the primary and secondary circuits under neutral pressure, preferably by a hydraulic bridge. According to a preferred embodiment, the additional pump is driven electrically, independently of the engine r.p.m. In a further advantageous embodiment, a heat exchanger — preferably the condenser of an air conditioner — is incorporated to cool the secondary circuit.

The admission temperature of the air conditioner heat exchanger may be controlled or regulated in an advantageous manner by means of a 3-way valve. The admission temperature of the air conditioner heat exchanger may be controlled advantageously by a second pump, the delivery rate of this pump being controlled, preferably by an r.p.m. pulse control.

A second additional pump can be fitted advantageously parallel to the heater heat-exchanger.

A partially advantageous embodiment is obtained when a known form of hydraulic bridge is used. The connections of the heater circuit are preferably provided in the neutral area of the hydraulic bridge, with a 3-way valve in the heater heat-exchanger. In such an embodiment the throughput through the air-conditioner heat exchanger is completely independent of the engine r.p.m. It is particularly desirable to install the hydraulic bridge in the radiator inlet.

In a modified embodiment of the invention, a second additional pump is installed instead of the 3-way valve parallel to the heater heat-exchanger.

Additional features and advantages of the invention will be apparent from the drawings, which show embodiments in schematic form.

Figure 1:
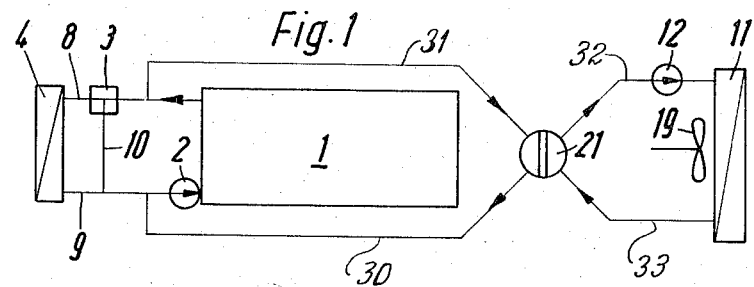
FIG. 1 is a schematic view of one embodiment of the invention, with a 4-way mixing valve.

Noting FIG. 1 there is seen a first embodiment circuit according to the invention containing a heat source, e.g., an internal combustion engine 1 with a primary cooling circuit, to which a radiator 4 is connected via a radiator inlet line 8 and return line 9, and a motor-driven pump 2 in the radiator return. A thermostatic control 3 is included in the inlet, such thermostatic control operating a short-circuit or bypass line 10, depending on the coolant temperature.

According to the invention, a 4-way mixing valve 21 is provided in the secondary circuit, this valve being connected to the radiator return 9 of the primary circuit via a line 30 and in turn being connected to the radiator inlet 8 by a line 31. Two other connections 32 and 33 run, respectively, to and from a heater heat exchanger 11, with an additional pump 12 in the inlet 32. The motor-driven pump 2 can then be operated directly in normal fashion or via additional drive mechanisms by the engine 1.

The additional pump 12 is driven electrically, preferably in pulses. This means that heat exchanger 11 will receive a high throughput largely independently of the engine r.p.m., so that uniform temperatures will be obtained over the cross section of the heat exchanger 11 in the airstream of a suitable fan 19.

Figure 2:
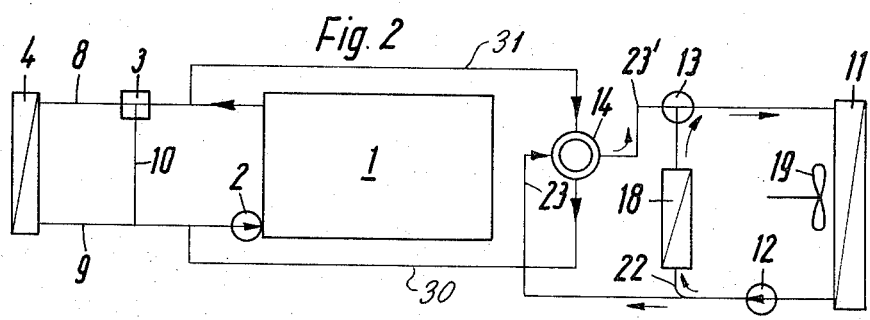
FIG. 2 is a schematic view of an embodiment with a hydraulic bridge, with one leg each in the radiator inlet and radiator return.

In the embodiment according to FIG. 2, a known form of hydraulic bridge 14 is used instead of the 4-way mixing valve. Once again, two connections 31, 30 of the hydraulic bridge run to the radiator inlet 8 and outlet 9, while the other two connections 23 and 23' of the bridge 14 are connected to the heat exchanger 11. In this embodiment, the throughput through the heat exchanger 11 is completely independent of the engine r.p.m. With the aid of a 3-way valve 13, an evaporator 18 of an air-conditioner can be connected in the secondary heating circuit. The air outlet temperature from heat exchanger 11 can be set by mixing the partial flow from line 22, behind the additional pump 12, with flow from line 23', connected to the primary circuit via the hydraulic bridge 14.

Figure 3:
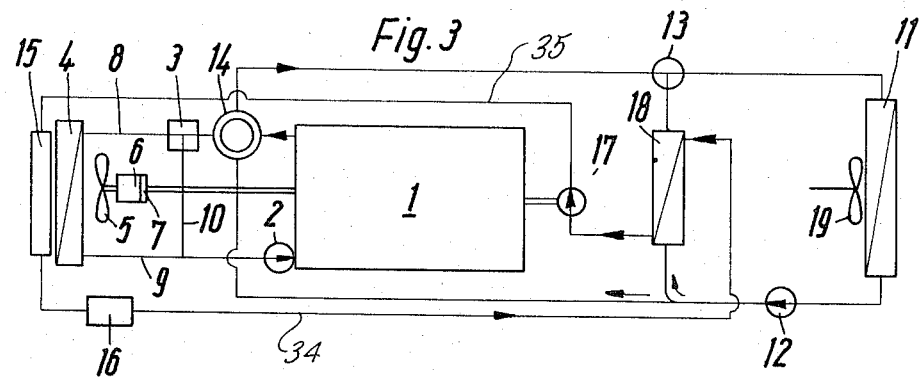
FIG. 3 is a schematic view of an embodiment in which the hydraulic bridge is installed in the radiator outlet.

FIG. 3. shows an embodiment in which the heating and cooling system is shown completely. The internal combustion engine 1 drives a fan motor 6 with a fan 5 behind the radiator 4, the drive being carried out through a viscous coupling 7. A condenser 15 is advantageously mounted ahead of the radiator 4, such condenser being connected to an evaporator 18 via a line 34 and a liquid container 16. On the other side, the condenser 15 is connected by a coolant line 35 to a coolant pump 17, which is likewise connected to evaporator 18. The coolant pump 17 may be suitably driven by the internal combustion engine 1.

A fan 19 is mounted behind the heater heat-exchanger 11, as in all previously described embodiments of the invention. In contrast to the embodiment in FIG. 2, however, the hydraulic bridge 14 is connected to the cooling water intake 8 in the embodiment in FIG. 3. The choice between the embodiments according to FIG. 2 and FIG. 3 is made depending on structural details affecting installation.

Figure 4:
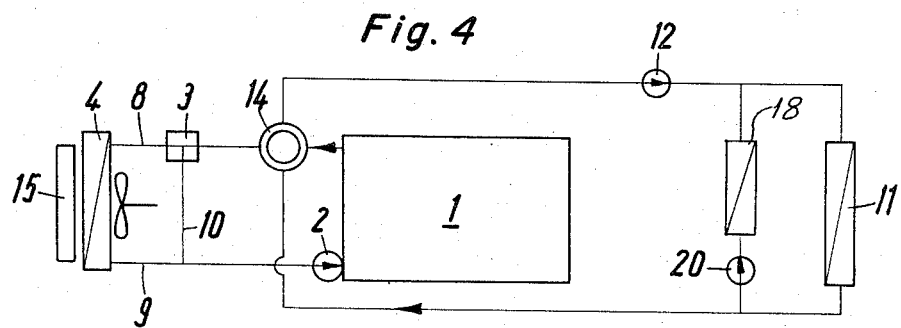
FIG. 4 is a schematic view of another embodiment with a second additional pump.

The embodiment according to FIG. 4 shows a modification in which a second additional pump 20 replaced the 3-way valve 13. In addition, the additional pump 12 must be driven as a junction of throughput, preferably with an r.p.m. pulsed control. The zero-point drift of the hydraulic bridge has a negligible influence.

The invention is not limited to the indicated and described embodiments which are offered illustratively, it it also encompasses all partial and sub-combinations of the described and/or shown features. It is to be understood that modification may be made without departing from the invention.

What is claimed is:

1. A heating and cooling system for a motor vehicle comprising:
    a primary circuit comprising
        an engine,
        a radiator,
        primary circuit pipe means for providing passageways for coolant between said engine and said radiator, and first pump means driven by said engine for circulating coolant through said primary circuit pipe means;
    a secondary circuit comprising
        heat exchange means for regulating the temperature of air blowing therethrough,
        cooling means for cooling the coolant that passes therethrough, and
        secondary circuit pipe means for providing passageways for coolant between said heat exchange means and said cooling means,
        said secondary circuit pipe means comprising a first pipe means for carrying coolant from said cooling means to said heat exchange means and a second pipe means for carrying coolant from said heat exchange means to said cooling means;
    fan means for blowing air through said heat exchange means;
    multichannel mixing means for connecting said primary and secondary circuits, said multichannel mixing means comprising
        a multichannel mixing device,
        first inlet means and first outlet means for providing passageways for coolant between said device and said primary circuit pipe means,
        second outlet means for providing a passageway for coolant from said device to said first pipe means of said secondary circuit pipe means, and
        second inlet means for providing a passageway for coolant from said second pipe means of said secondary circuit pipe means to said device; and
        second pump means driven independently of said engine for circulating coolant through said heat exchange means.

2. A system in accordance with claim 1 wherein said multichannel mixing device is a multichannel mixing valve.

3. A system in accordance with claim 1 wherein said secondary circuit further includes regulating means, connected to said secondary circuit pipe means, for regulating the ratio of coolant from said cooling means to that from said multichannel mixing means which enters said heat exchange means.

4. A system in accordance with claim 3 wherein said regulating means comprises a three-way valve connected to said first pipe means of said secondary circuit at the point where said second outlet means of said multichannel mixing means connects thereto.

5. A system in accordance with claim 3 wherein said regulating means comprises a third pump means for circulating coolant through said cooling means wherein said second pump means is connected to said second outlet means of said multi-channel mixing means and said third pump means is connected to said first pipe means of said secondary circuit upstream of the point where said second outlet means of said multichannel mixing means connects thereto or to said second pipe means of said secondary circuit downstream of the point where said second inlet means of said multichannel mixing means connects thereto.

6. A system in accordance with claim 5 wherein said third pump means is driven independently of said engine.

7. A system in accordance with claim 1 wherein said multichannel mixing device is a hydraulic bridge.

8. A system in accordance with claim 7 wherein said primary circuit pipe means comprises a first conduit means for carrying coolant from said engine to said radiator and a second conduit means for carrying coolant from said radiator to said engine, and further wherein said first inlet means of said multi-channel mixing means connects to said primary circuit pipe means at said first conduit means and said first outlet means connects to said primary circuit pipe means at said first conduit means downstream of the point where said first inlet means connects thereto.

9. A system in accordance with claim 7 wherein the connections of said second outlet and inlet means of said multichannel mixing device to said hydraulic bridge are in the neutral area of said hydraulic bridge.

10. A system in accordance with claim 1 wherein said primary circuit pipe means comprises a first conduit means for carrying coolant from said engine to said radiator and a second conduit means for carrying coolant from said radiator to said engine, and further wherein said first inlet means of said multi-channel mixing means connects to said primary circuit pipe means at said first conduit means and said first outlet means connects to said primary circuit pipe means at said second conduit means.

11. A system in accordance with claim 1 wherein said primary circuit pipe means comprises a first conduit means for carrying coolant from said engine to said radiator and a second conduit means for carrying coolant from said radiator to said engine, and wherein said primary circuit further includes by-pass means connected to said first and said second conduit means for causing said coolant to by-pass said radiator when activated and thermostat means connected to said first conduit means and said by-pass means for activating said by-pass means at predetermined times.

* * * * *

UNITED STATES PATENT OFFICE
CERTIFICATE OF CORRECTION

Patent No. 3,779,307    Dated Dec. 18, 1973

Inventor(s) Paul WEISS et al.

It is certified that error appears in the above-identified patent and that said Letters Patent are hereby corrected as shown below:

In the Title page at [73], delete:

"Assignee: Firma Su Ddeutsche Kuhlerfabrik"

and insert therefor

--Assignee: Firma Süddeutsche Kühlerfabrik--

Signed and sealed this 2nd day of July 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. __3,779,307__        Dated __December 18, 1973__

Inventor(s) __Paul WEISS et al.__

It is certified that error appears in the above-identified patent and that said Letters Patent are hereby corrected as shown below:

In the Title page at /73/ delete:

Assignee: Firma Su Ddeutsche Kuhlerfabrik
                 Julius Fr. Behr.,
                 Stuttgart-Feuerbach, Mauserat,
                 Germany and insert therefore:

--Assignee: Firma Suddeutsche Kuhlerfabrik
                   Julius Fr. Behr.,
                   Stuttgart-Feuerbach, Mauserstrasse
                   Germany--

This certificate supersedes Certificste of Correction issued July 2, 1974.

Signed and sealed this 17th day of September 1974

(SEAL)
Attest:

McCOY M. GIBSON JR.
Attesting Officer

C. MARSHALL DANN
Commissioner of Patents